April 7, 1970            W. E. JONES            3,504,408

APPARATUS FOR MOLDING INTERLOCKING CONCRETE BLOCKS

Original Filed Dec. 27, 1965            8 Sheets-Sheet 1

Inventor
William E. Jones
By Cushman, Darby & Cushman
Attorneys

Inventor
William E. Jones
By Cushman, Darby & Cushman
Attorneys

Inventor
William E. Jones
By Cushman, Darby & Cushman
Attorneys

United States Patent Office

3,504,408
Patented Apr. 7, 1970

1

3,504,408
APPARATUS FOR MOLDING INTERLOCKING CONCRETE BLOCKS
William E. Jones, 141 Regent St., Beaconsfield, Quebec, Canada
Continuation of application Ser. No. 516,299, Dec. 27, 1965. This application Jan. 21, 1969, Ser. No. 797,339
Claims priority, application Canada, Jan. 9, 1965, 920,435
Int. Cl. B28b 7/20
U.S. Cl. 25—41      7 Claims

ABSTRACT OF THE DISCLOSURE

An apparatus for use on a high-speed concrete block moulding machine, so as to form blocks having upper and lower contoured faces, without providing specially contoured pallets to shape and support the blocks. The apparatus includes one or more horizontal members insertable through apertures in sidewalls of the mould prior to filling of the mould. The horizontal members remain in the mould during the forming of the block, and are withdrawn just prior to the block being stripped through the bottom of the mould onto a flat pallet.

---

This application is a continuation of Ser. No. 516,299, filed Dec. 27, 1965, now abandoned.

This invention relates to apparatus for forming moulded concrete articles and more particularly to apparatus for moulding interlocking concrete blocks.

Interlocking blocks of the type having internal openings and grooves in register with each other and adapted to be filled with grout mortar or the like are known in the art. However, the relatively high cost of producing such interlocking blocks has precluded their wide spread use.

The high production costs arise due to the fact that heretofore it has not been possible to form blocks with contoured lower faces on a standard high production concrete block machine without providing special pallets or special inserts for the moulds. Furthermore, as building blocks are generally stripped through the bottom of the mould, it has been considered impractical to provide horizontal undercuts of any kind in a moulded concrete article produced on such machines.

It is a feature of this invention to provide apparatus for forming a concrete article having a contoured lower face without the use of special contoured pallets.

A further feature of this invention is the provision of an apparatus whereby contours and undercuts can be provided in a concrete article without the use of specially formed pallets or mould inserts which must be placed in the mould by hand. It is, therefore, possible to operate the machine at a higher speed and eliminate the hand labour that would otherwise be required in the manufacture of such articles.

The present invention provides an apparatus for use with a mould of a concrete block forming machine, said apparatus comprising at least one horizontally disposed transversely extending member adapted to be inserted through an aperture in a side wall of said mould and adapted to be withdrawn from said mould prior to stripping the concrete block from said mould.

A building block made with the apparatus of this invention has a longitudinal rib upon its upper side, said rib being of a width only slightly less than the width of the block and having a substantially flat, horizontal top surface provided with a central longitudinal groove therein, there being a longitudinal recess with a central longitudinal groove in the bottom thereof in the lower side

2 of the block, the recess being of greater depth than the height of the rib and otherwise corresponding in shape to said rib, said last-named groove being substantially in a vertical plane common with the first-named groove, said recess being arranged to receive the rib on the upper side of a similar block so as to form a wide flat longitudinal mortar space of slightly less width than the block with a central longitudinal enlarged portion formed partly in the top and partly in the bottom of the block, and the block having a vertical opening therethrough communicating at its upper and lower ends with intermediate portions of said central longitudinal grooves for the purpose of providing an internal mortar space entirely within the outline of the block, said vertical opening being formed so as to taper toward a reduced cross section at said longitudinal rib to facilitate release from a mould when said block is formed in an inverted position.

In the drawings, FIGURE 1 is a perspective view of an interlocking concrete building block provided with central mortar spaces or grooves;

Figure 1:
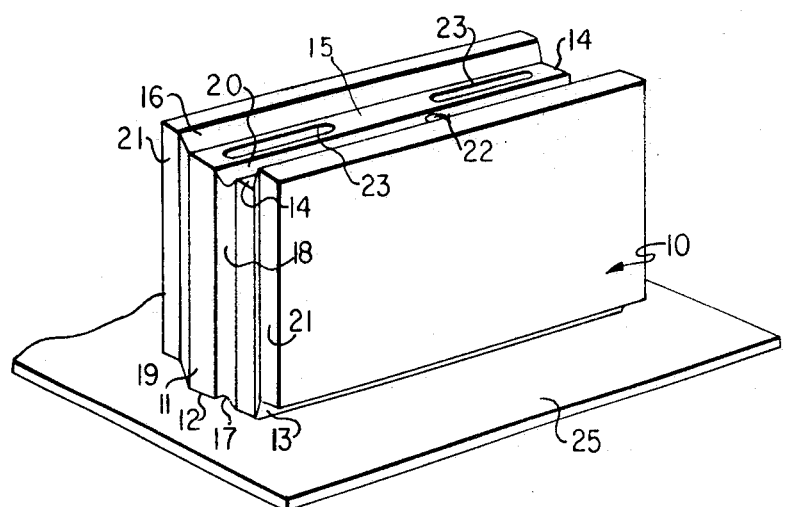

Referring now in detail to the drawings, an interlocking type building block 10 is shown inverted in FIGURE 1, includes a horizontal, longitudinally disposed rib or projection 11, having a substantially flat top wall 12, and upwardly converging side walls 13 formed upon the top of each block. The bottom of each block 10 is longitudinally recessed as indicated at 14, the recess being preferably slightly deeper than the rib or projection 11, and having a flat top wall 15, and upwardly inclined side walls 16 to receive the rib 11 of the next lower block, when the blocks are laid up in a wall.

Also, as best shown in FIGURE 1, it is desirable that the space between the flat portion 12 of the rib 11 and the flat wall 15 of the recess 14 in the next upper block is so slight that grout or mortar will not flow outwardly therethrough.

The recess 14 is preferably slightly wider than the rib 11, and the inclined side walls 16 thereof are located at angles slightly less than the inclined side walls 13 of the rib so as to provide for quickly and easily locating each block upon the next lower blocks in the wall and permitting of a slight lateral shifting of the block to accurately align it in the wall.

A central, longitudinally disposed groove 17, which is preferably half round in cross section, is located through the rib 12 and communicates at each end with similarly shaped vertical grooves 18, centrally located in the flat end walls 19 of the block, and a correspondingly shaped, centrally disposed groove 20 is longitudinally located through the recess 14 in the bottom of the block.

Substantially narrow, vertical ribs 21 may be formed at each end of the block, at each side thereof so as to slightly recess the end walls 19 thereof, whereby when two blocks are butted together in a course, the ribs 21 only of the blocks will contact, leaving a flat, wide space between the end walls of adjacent blocks with the central vertical enlargement 18 to receive grout or mortar for bonding the blocks together vertically.

A central, vertical aperture 22 is located entirely through each block from top to bottom, communicating at opposite ends with the upper and lower grooves 17 and 20. Vertical cored openings 23 are formed on each side of the longitudinal center of the block, extending from the bottom of the block through the top thereof.

It will be appreciated that the block 10 shown in FIGURE 1 is inverted to provide a greater area to support the weight of the block as it rests on a flat steel pallet 25. In use, however, the recess 14 will preferably be at the underside of the block 10.

Figure 2:
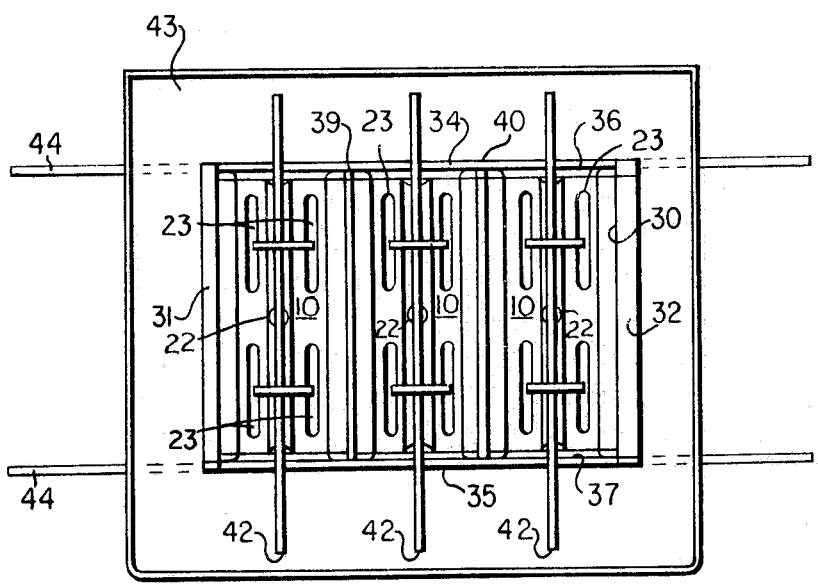
FIGURE 2 is a top plan view of a typical mould used for moulding the building block of FIGURE 1.

Three concrete blocks of this size are produced at one time in a typical concrete block making machine. A three compartment mould shown generally at 30 in FIGURE 2 is used for this purpose.

The mould 30 includes a pair of side walls 31 and 32 and a pair of end walls 34 and 35. End liners 36 and 37 are provided to give the desired configuration to the ends of the blocks 10 and division plates 39 and 40 are provided between the blocks. Identical core assemblies 42 are provided for each of the three blocks to form the vertical aperture 22 and the vertical cored opening 23 of the blocks 10.

Figure 3:
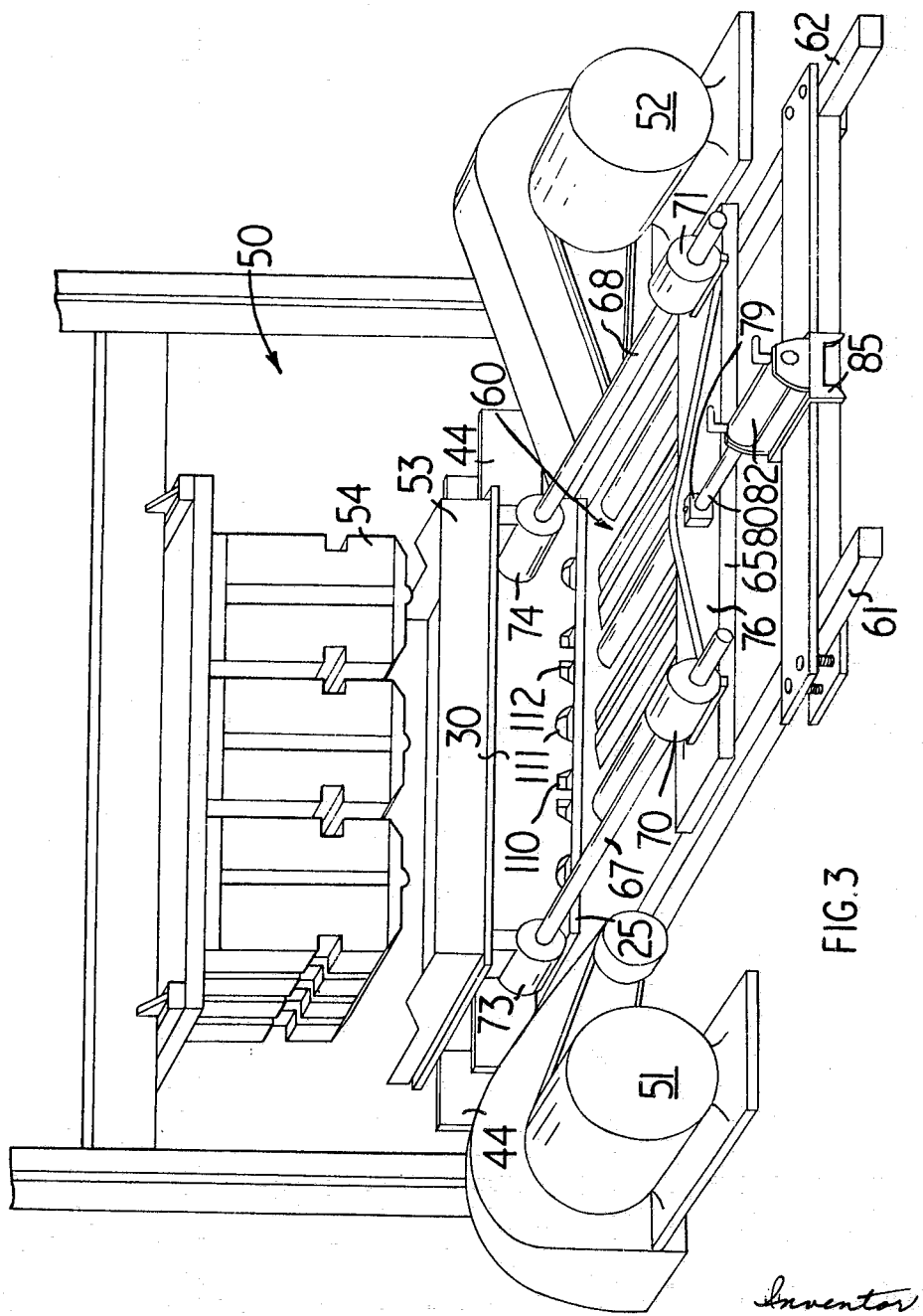
FIGURE 3 is a perspective view of a concrete block machine on which the apparatus of this invention has been installed.

A mould top plate 43 extends outwardly from the mould 30 on all sides and is provided with pairs of bars 44 projecting therefrom on both sides to support the mould in a concrete block machine 50 illustrated in FIGURE 3.

The machine itself need not be described in detail, however, a brief description of the elements relating to this invention will be given.

The mould 30 is supported in the machine 50 so as to be vibrated by eccentrics thereon driven by the two electric motors 51 and 52. A flat steel pallet such as the one indicated at 25 in FIGURE 1 is raised under the mould 30 to form the bottom thereof. A feed drawer (not shown) is adapted to move over the mould 30 to fill the mould with a concrete mixture. A splash guard 53 is provided above the mould 30.

Positioned above the mould 30 is a mould head 54 adapted to be hydraulically or mechanically moved toward the mould to compact the concrete mixture.

Briefly, in operation of the machine, a pallet 25 is raised to the underside of the mould, the feed drawer (not shown) comes forward to fill the mould with a concrete mixture at which time the mould is vibrated. The feed drawer then retracts and the head 54 compacts the material in the mould as vibration continues. When the desired height of the concrete article is attained, the article is stripped through the bottom of the mould. This is accomplished by the head 54 moving through the mould 30 as the pallet 30 drops down. The pallet 30 is then picked up by conveying means (not shown).

The concrete block 10 and the machine 50 for automatically producing such blocks, having been described above, make the purpose of the instant invention more readily apparent.

Accordingly, in FIGURE 3 an apparatus for providing the contour of the under-surface of the block 10 is indicated generally by the numeral 60. The apparatus 60 is preferably secured to rails 61 and 62 of the machine 50.

Figure 4:
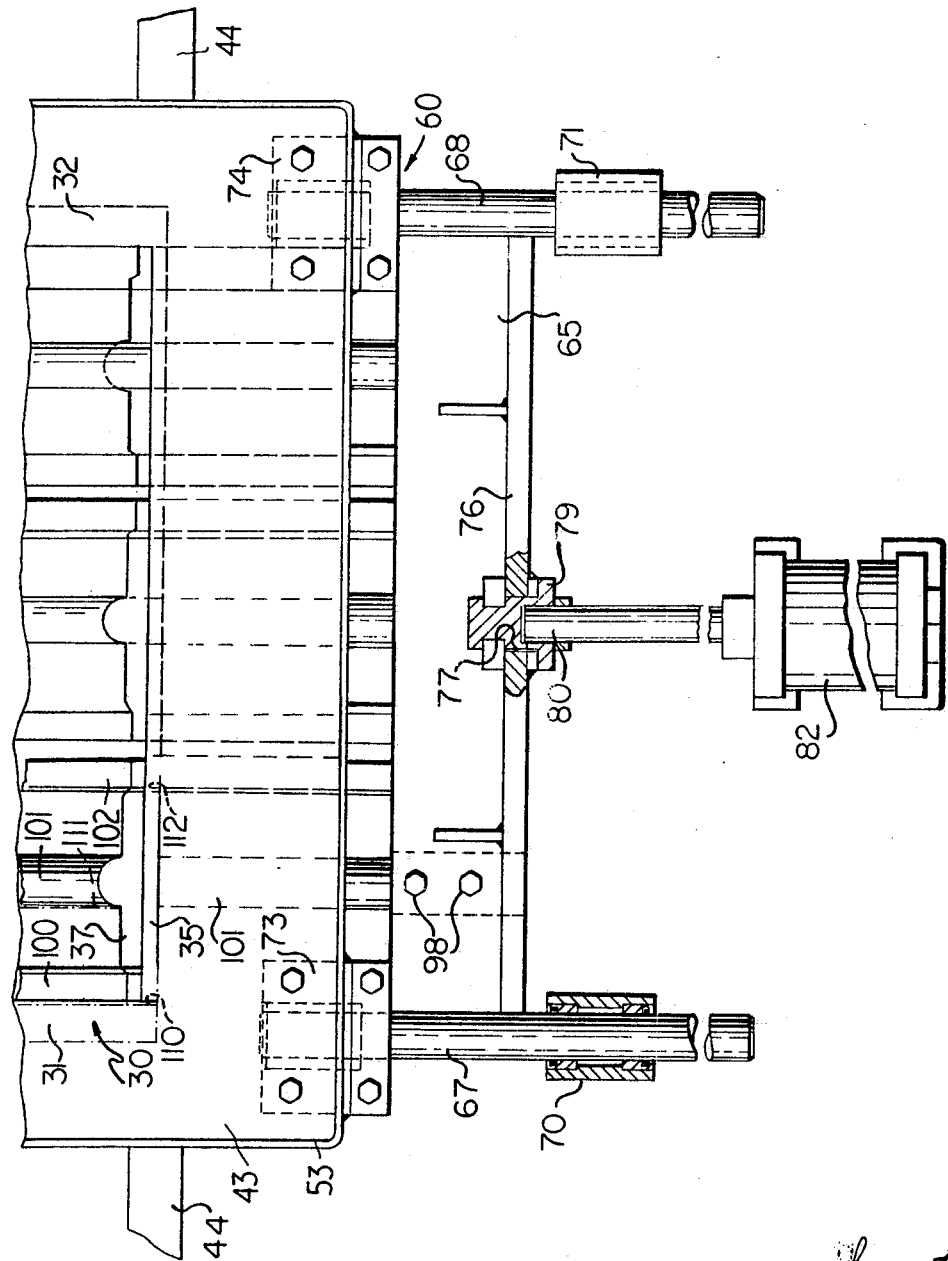
FIGURE 4 is a fragmentary top plan view of the apparatus of this invention showing in addition, a portion of a mould to which the apparatus is attached.
Figure 5:
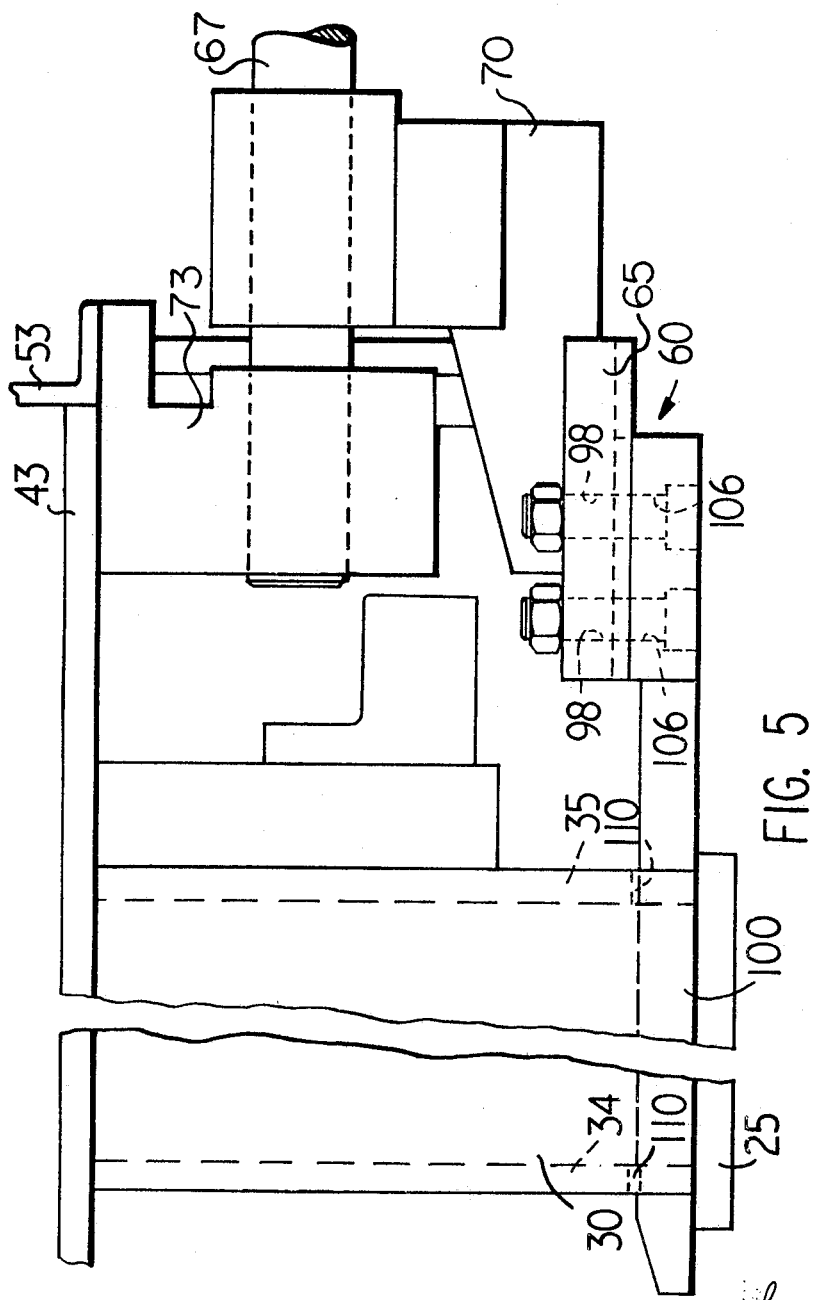
FIGURE 5 is a side elevational view of a portion of the apparatus of this invention.

As shown more clearly in FIGURES 4 and 5, the apparatus 60 comprises a push bar 65 slidably suspended from a pair of spaced apart guide bars 67 and 68 by brackets 70 and 71, respectively. The guide bars 67 and 68 are in turn secured to the top plate 43 of the mould 30 by suitable brackets 73 and 74 respectively.

Figure 6:
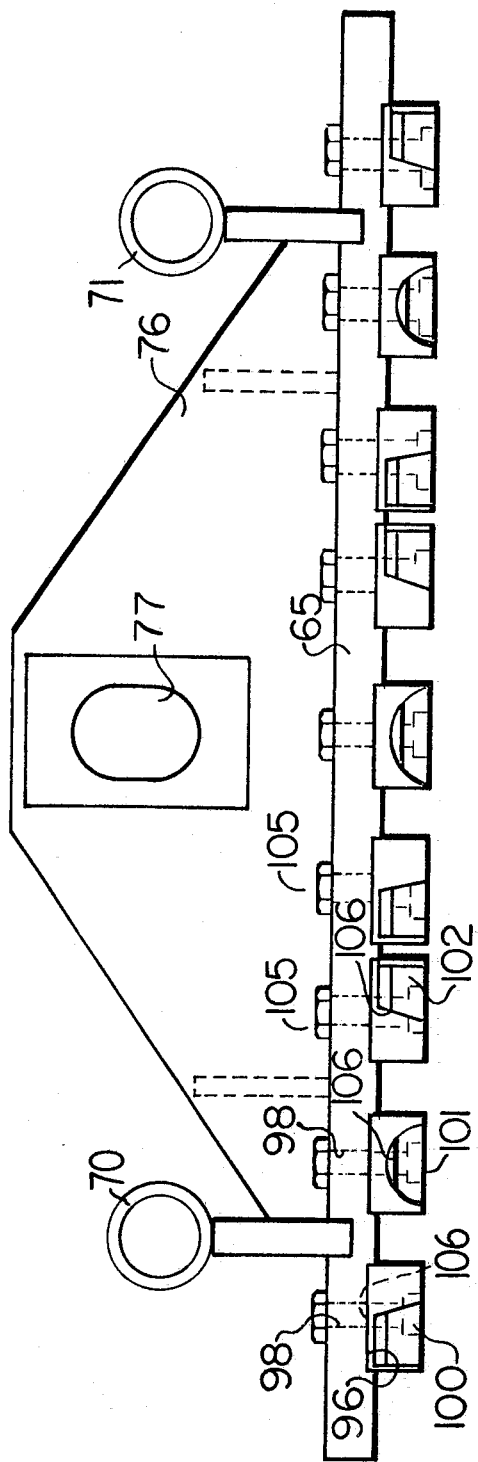
FIGURE 6 is an end elevation view of the apparatus from the leading end.

As shown more clearly in FIGURE 6, the push bar 65 is provided with a longitudinally extending vertically disposed push plate 76 secured thereto, which has an oval aperture 77 at the mid-portion thereof. A coupling 79 received in the aperture 77 and loosely secured to the plate 76 receives one end of a piston 80 of a double acting air or hydraulic cylinder 82.

Figure 8:
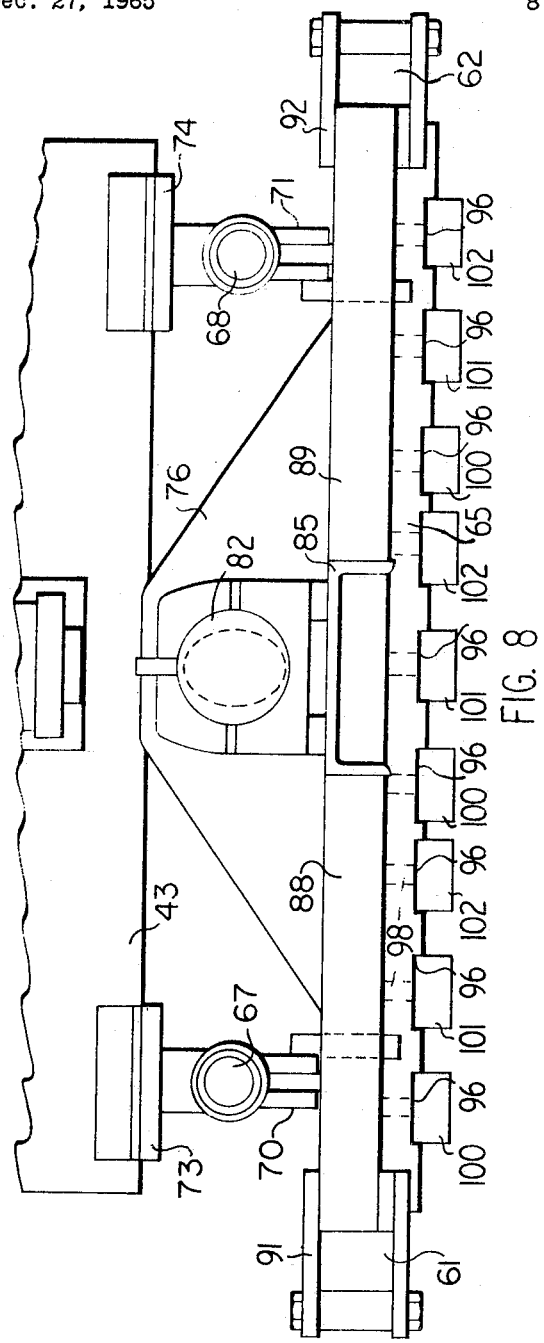
FIGURE 8 is an end elevational view from the trailing end of the apparatus.

The air cylinder 82 is mounted on a base 85 (see FIGURE 8) having lateral extensions 88 and 89 adapted to be secured to rails 61 and 62 of the machine 50 by brackets 91 and 92 in a conventional manner.

It will be appreciated that the coupling 79 provides for vibration of the push bar 65 which is secured to the mould 30, whereas, the air cylinder 82 is mounted on the machine 50.

The underside of the push bar 65 is provided with a plurality of grooves 96 (see FIGURES 6 and 8) and a plurality of pairs of bolt receiving apertures 98 in register therewith.

Figure 7:
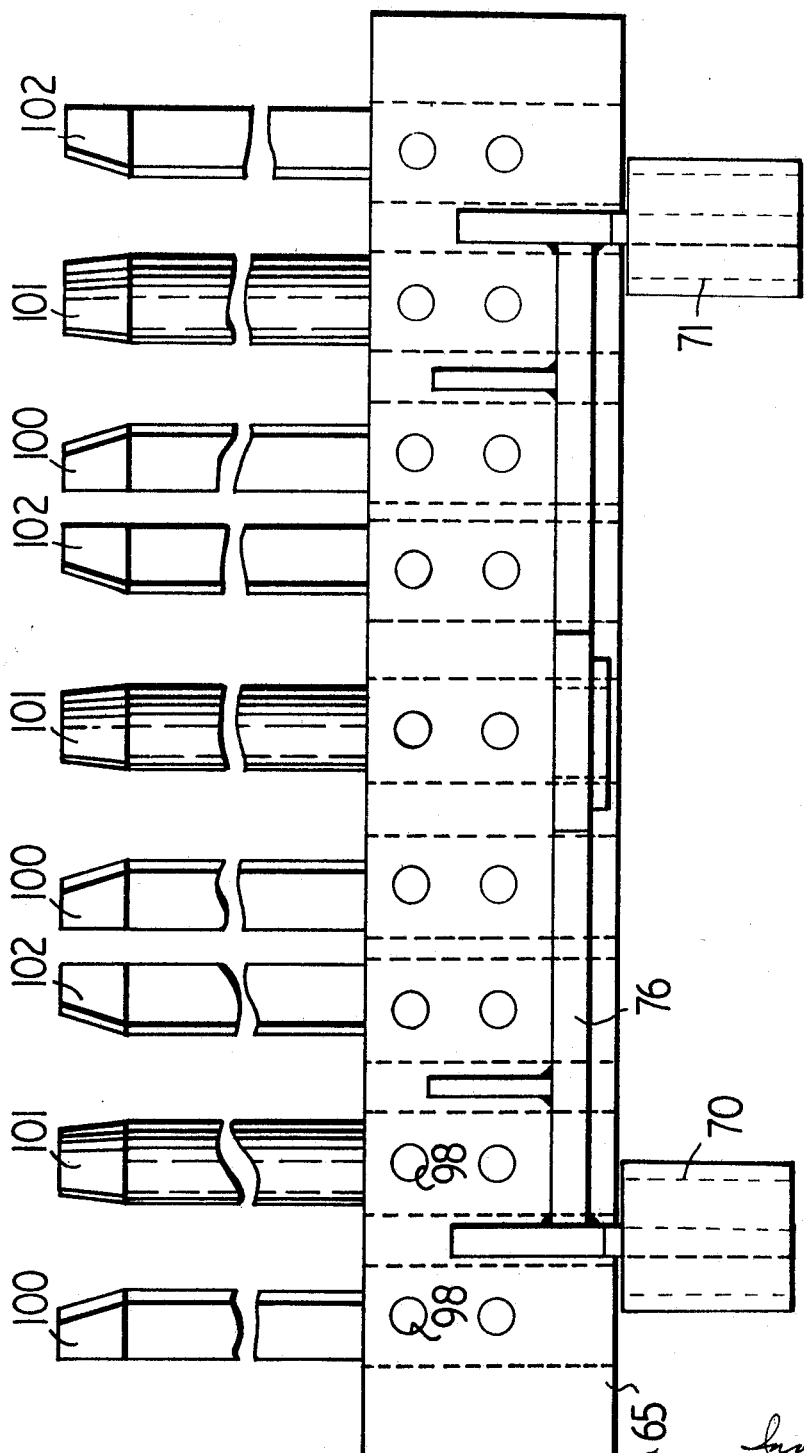
FIGURE 7 is a top plan view of a portion of the apparatus.

As shown more clearly in FIGURES 6 and 7, each of the grooves 96 is adapted to receive one of a set of elongated mould inserts.

To provide the particular configuration of the underside of the block 10 described and illustrated herein, a set of three mould inserts 100, 101 and 102 are required and as three blocks are produced in the mould 30, three sets of inserts are provided.

The elongated inserts 100, 101 and 102 are secured to the push bar 65 by bolts 105 extending through the apertures 98 and through suitable aligned apertures 106 therein, in a conventional manner.

It will be noted that the elongated inserts 100 and 102 have inclined inner edges and that insert 102 is semi-cylindrical in cross-section. The inserts 100, 101 and 102 are preferably provided with slightly pointed outer ends and are of a length sufficient to extend across the cavity of the mould 30.

As shown in FIGURE 4, aligned apertures 110, 111 and 112 of the appropriate shape are provided in the mould walls 34 and 35 and each of the mould liners 36 and 37 to allow the inserts 100, 101 and 102, respectively, to pass therethrough.

Figure 9:
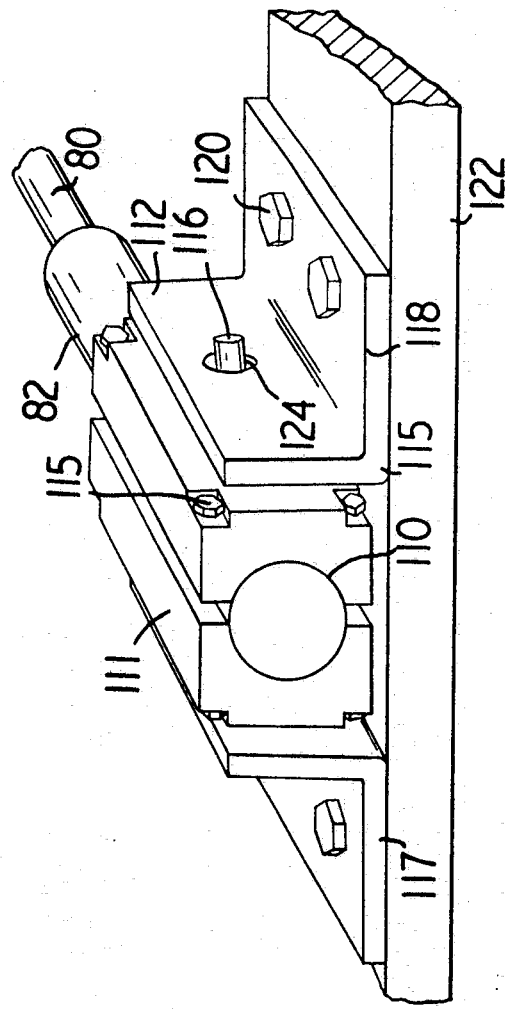
FIGURE 9 is a perspective view of an alternative construction of a portion of the apparatus.

Alternatively the air cylinder or hydraulic cylinder 82 is pivotally mounted as shown in FIGURE 9. The cylinder 82 is received in a bore 110 defined between the mating faces of blocks 111 and 112.

The blocks 111 and 112 are secured together so as to frictionally engage the cylinder 82 by bolts 115 which pass therethrough.

An external side wall of each of the blocks 111 and 112 is provided with a horizontally disposed pin 116 (only one of which is shown) secured thereto as by threaded engagement in bores in the blocks 111 and 112.

The cylinder 82 and blocks 111 and 112 are received between a pair of right angle brackets 117 and 118 secured as by bolts 120 to a transverse member 122 secured between the rails 61 and 62 in the same manner as the extrusions 88 and 89 described above. The vertically disposed portions of each of the brackets 117 and 118 have centrally located apertures 124 (only one of which is shown) through which the pins 116 extend.

In operation, having regard to the foregoing description of operation of the machines 50, the apparatus of this invention is energized prior to the mould 30 being filled with the concrete mixture. This is accomplished by providing air or hydraulic fluid under pressure to the cylinder 82 through a suitable supply line (not shown). The piston 80 moves out of the cylinder 82 and acts on the push bar 65 which in turn causes the inserts 100, 101 and 102 to move into the mould.

Preferably the inserts 100, 101, 102 are moved into the mould while the pallet 25 is being raised to the underside of the mould 30 and thus no delay is caused by adding this step to the normal operating cycle of the machine.

When the inserts 100, 101 and 102 are in place in the mould 30, the filling, vibrating and compacting steps mentioned above take place. The double acting air cylinder 82 is again energized to retract the push bar and its attached inserts 100, 101, and 102 and the building blocks 10 are stripped through the bottom of the mould 30. The block 10, if properly formed, will be firm enough to support itself on a plain or flat pallet 25.

The desired configuration of the upper surface of the block 10 as viewed in FIGURE 1 is, of course, provided by the contour of the head 54 of the machine.

What I claim is:

1. An apparatus for forming concrete building blocks in an inverted state, said blocks when in use include a bottom wall having a longitudinally extending recess of a width greater than half of the width of said block and a top wall having an upstanding rib adapted to be received in a recess in a bottom wall of a similar building unit placed thereon, said apparatus comprising a mould including core members suspended therein, means for inserting and withdrawing horizontally disposed members through a wall of said mould adjacent a removable substantially flat plate forming the bottom of said mould, said horizontal members forming the rib on said top wall, means for filling said mould with concrete mixture, means for forming said recess in said bottom wall of said block by applying a suitably shaped member to the concrete at the top of said mould, means for agitating said mixture to cause said concrete to set, means for stripping said concrete block through the bottom of said mould on said removable substantially flat plate and means for moving said plate and block away from the bottom of the mould.

2. A concrete block forming machine as claimed in claim 1 wherein said horizontally disposed member is slidably secured to guide means fixedly secured to said mould.

3. A concrete block forming machine as claimed in claim 1 wherein said horizontally disposed member is slidably secured to guide means fixedly secured to said mould and said piston-cylinder assembly is secured to stationary frame members of said machine.

4. A concrete block forming machine as claimed in claim 1 wherein said means for inserting said horizontal member and means for withdrawing said horizontal member comprise at least one fluid operated piston-cylinder assembly.

5. A concrete block machine as claimed in claim 4 wherein a resilient coupling interconnects said piston-cylinder assembly and said horizontally disposed member to facilitate vibration of said mould and said horizontal member without transmitting vibration to said piston-cylinder assembly.

6. A concrete block forming machine as claimed in claim 4 wherein said piston-cylinder is mounted for limited pivotal movement with respect to said frame.

7. In a concrete block forming machine including a frame, a mould having side walls, a substantially flat removable plate forming the bottom of said mould, means on said machine to position said flat plate under said mould, means for vibrating said mould, feed means for filling said mould, and means for stripping said concrete article through the bottom of said mould onto said flat plate, an attachment comprising: at least one horizontally disposed transversely extending member attached to said frame for reciprocal movement, at least one fluid operative piston-cylinder assembly means for inserting said horizontal member into said mould through an aperture in one of said side walls of said mould, said means for inserting said horizontal member being actuated during operation of said means to position said flat plate, and at least one fluid operative piston-cylinder assembly means for withdrawing said horizontally disposed member after said vibrating means has been operated and prior to stripping said block from said mould.

References Cited

UNITED STATES PATENTS

| | | | |
|---|---|---|---|
| 840,907 | 1/1907 | Buxrill | 25—415 X |
| 2,005,200 | 6/1935 | Gorman | 25—415 X |
| 2,526,198 | 10/1950 | Clanton | 25—41 |
| 2,566,787 | 9/1951 | Zevely | 25—41 |
| 2,583,597 | 1/1952 | Ryner | 25—41 |
| 2,821,005 | 1/1958 | Davis. | |

WILLIAM J. STEPHENSON, Primary Examiner